United States Patent
Oh et al.

(10) Patent No.: US 9,813,203 B2
(45) Date of Patent: Nov. 7, 2017

(54) GENERATION OF A PILOT SIGNAL IN A BASE STATION

(71) Applicant: EMPIRE TECHNOLOGY DEVELOPMENT LLC, Wilmington, DE (US)

(72) Inventors: Hyun Oh Oh, Gwacheon-si (KR); Jin Sam Kwak, Uiwang-si (KR); Ju Hyung Son, Uiwang-si (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 271 days.

(21) Appl. No.: 14/302,434

(22) Filed: Jun. 12, 2014

(65) Prior Publication Data

US 2015/0365211 A1  Dec. 17, 2015

(51) Int. Cl.
*H04L 5/00* (2006.01)
*H04W 84/18* (2009.01)

(52) U.S. Cl.
CPC ............ *H04L 5/0033* (2013.01); *H04L 5/005* (2013.01); *H04L 5/0073* (2013.01); *H04W 84/18* (2013.01)

(58) Field of Classification Search
None
See application file for complete search history.

(56) References Cited

U.S. PATENT DOCUMENTS 7,218,936 B2 *   5/2007  Rinne ................... H04W 48/12
                                                                370/330
8,600,428 B2   12/2013  Gong et al.
2008/0299984 A1 * 12/2008  Shimomura ........ H04W 52/325
                                                                455/446
2009/0104908 A1 *  4/2009  Matsumoto ........... H04L 5/0046
                                                                455/436
2009/0186621 A1 *  7/2009  Umeda ................. H04L 1/0003
                                                                455/446
2010/0022266 A1   1/2010  Villier et al.

(Continued)

OTHER PUBLICATIONS

Hendra Setiawan et al., "LTE Physical Layer Identity Detection: Frequency vs Time Domain Schemes," in proceedings of IEEE Communications Society in the IEEE International Conference on Communications, 2011.

(Continued)

*Primary Examiner* — Yemane Mesfin
*Assistant Examiner* — Peter Chen
(74) *Attorney, Agent, or Firm* — Turk IP Law, LLC

(57) ABSTRACT

Technologies are generally described for generating pilot signal patterns in a base station, such as a small-cell base station, or a self-organizing network (SON) in a mobile communication system. Example devices/systems described herein may include one or more of a storage unit, a control unit and/or a communication unit in a base station. The storage unit may be configured to store a pilot signal pattern corresponding to a power variation between a first power level and a second power level. The control unit may be coupled to the storage unit and configured to generate a pilot signal in accordance with the stored pilot signal pattern. Further, the communication unit may be coupled to the control unit and configured to transmit the generated pilot signal such that any nearby mobile stations (or user equipment) can use the signal to perform cell selection or re-selection.

18 Claims, 12 Drawing Sheets

(56) References Cited

U.S. PATENT DOCUMENTS

| | | | | |
|---|---|---|---|---|
| 2010/0234040 A1* | 9/2010 | Palanki | ................ | H04L 5/0073 455/452.2 |
| 2011/0009105 A1* | 1/2011 | Lee | ..................... | H01Q 9/0407 455/418 |
| 2015/0281973 A1* | 10/2015 | Svedman | ............ | H04B 7/0691 455/454 |

OTHER PUBLICATIONS

Raja Sekhar Tumburu et al., "Downlink Cell Search for IEEE 802.16m Systems," accessed at <URL: http://web.archive.org/web/20140529091720/http://wcsn.iiita.ac.in/paper/P6.pdf>, accessed on May 29, 2014.

* cited by examiner

GENERATION OF A PILOT SIGNAL IN A BASE STATION

BACKGROUND

Unless otherwise indicated herein, the approaches described in this section are not prior art to the claims in this application and are not admitted to be prior art by inclusion in this section.

In a mobile communication system, a base station may transmit a pilot signal such that mobile stations (such as a user's wireless communication device) may use the signal to perform cell selection and re-selection. In particular, mobile stations may measure power of a pilot signal to determine the level of coverage that the mobile stations may obtain from a particular base station. The pilot signal may typically be transmitted at a constant power level to provide a fixed reference for the mobile stations because pilot signals having a constant power level, in general, may clearly and simply define the coverage area of each individual cell.

However, generation and transmission of pilot signals with constant power levels may also cause a relatively high level of interference by base stations that may not be currently serving any mobile stations. Mass deployment of small-cell base stations in mobile communication systems may create further technical challenges, such as interference between neighboring small cells as well as between small cells and macro cells, because small cells may share the same licensed frequency spectrum with macro cells. For example, in a dense small cell environment such as crowded buildings or an apartment complex, a mobile station may fail to detect a pilot signal from a macro-cell base station, which is located at a relatively farther distance, due to a high level of interferences from neighbor small-cell stations.

In order to mitigate the above problem, orthogonal frequency reuse or correlation with orthogonal sequence techniques have been proposed. In a World Interoperability for Microwave Access (WiMax) system, a frequency reuse method may be used for cell search preamble transmission, where separate subcarrier sets may be allocated to different neighbor cells so that they do not collide at the same subcarrier position. Also, in a Long Term Evolution (LTE) system, a primary synchronization signal (PSS) with a Zadoff-Chu sequence may be used for obtaining good correlation properties of a cell search signal from neighbor cells. However, when a large number of small cells are densely installed in a limited area, hard partitioning of radio resources may degrade the resource utilization efficiency and cause shortage of sequences allocated for the cells.

SUMMARY

Technologies generally described herein relate to generating a pilot signal in a mobile communication system.

Various example base stations described herein may include one or more of a storage unit, a control unit and/or a communication unit. The storage unit may be configured to store a pilot signal pattern corresponding to a power variation between a first power level and a second power level. The control unit may be coupled to the storage unit and configured to generate a pilot signal in accordance with the stored pilot signal pattern. The communication unit may be coupled to the control unit and configured to transmit the generated pilot signal.

In some examples, self-organizing network (SON) servers are described. Example SON servers may include a control unit, a storage unit and/or a communication unit. The control unit may be configured to generate one or more pilot signal patterns each corresponding to a power variation between a first power level and a second power level. The storage unit may be coupled to the control unit and configured to store the generated pilot signal patterns and one or more cell identifiers associated with the generated pilot signal patterns. The communication unit may be coupled to the storage unit and configured to, in response to a pilot signal pattern request that includes a cell identifier, transmit a pilot signal pattern associated with the cell identifier among the pilot signal patterns stored in the storage unit.

In some examples, methods to generate a pilot signal in a base station are described. Example methods may include storing a pilot signal pattern corresponding to a power variation between a first power level and a second power level. A pilot signal may be generated in accordance with the stored pilot signal pattern. The generated pilot signal may be transmitted.

In some examples, methods to generate a pilot signal in a SON server are described. Example methods may include generating one or more pilot signal patterns each corresponding to a power variation between a first power level and a second power level. The generated pilot signal patterns and one or more cell identifiers associated with the generated pilot signal patterns may be stored. In response to a pilot signal pattern request that includes a cell identifier, a pilot signal pattern associated with the cell identifier among the stored pilot signal patterns may be transmitted.

In some examples, a computer-readable storage medium is described that may be adapted to store a program executable by one or more processors. The processor may include various features as further described herein. The program may include one or more instructions to store a pilot signal pattern corresponding to a power variation between a first power level and a second power level, generate a pilot signal in accordance with the stored pilot signal pattern, and transmit the generated pilot signal. In some other examples, the program may include one or more instructions to generate one or more pilot signal patterns each corresponding to a power variation between a first power level and a second power level, store the generated pilot signal patterns and one or more cell identifiers associated with the generated pilot signal patterns, and in response to a pilot signal pattern request that includes a cell identifier, transmit a pilot signal pattern associated with the cell identifier among the stored pilot signal patterns.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
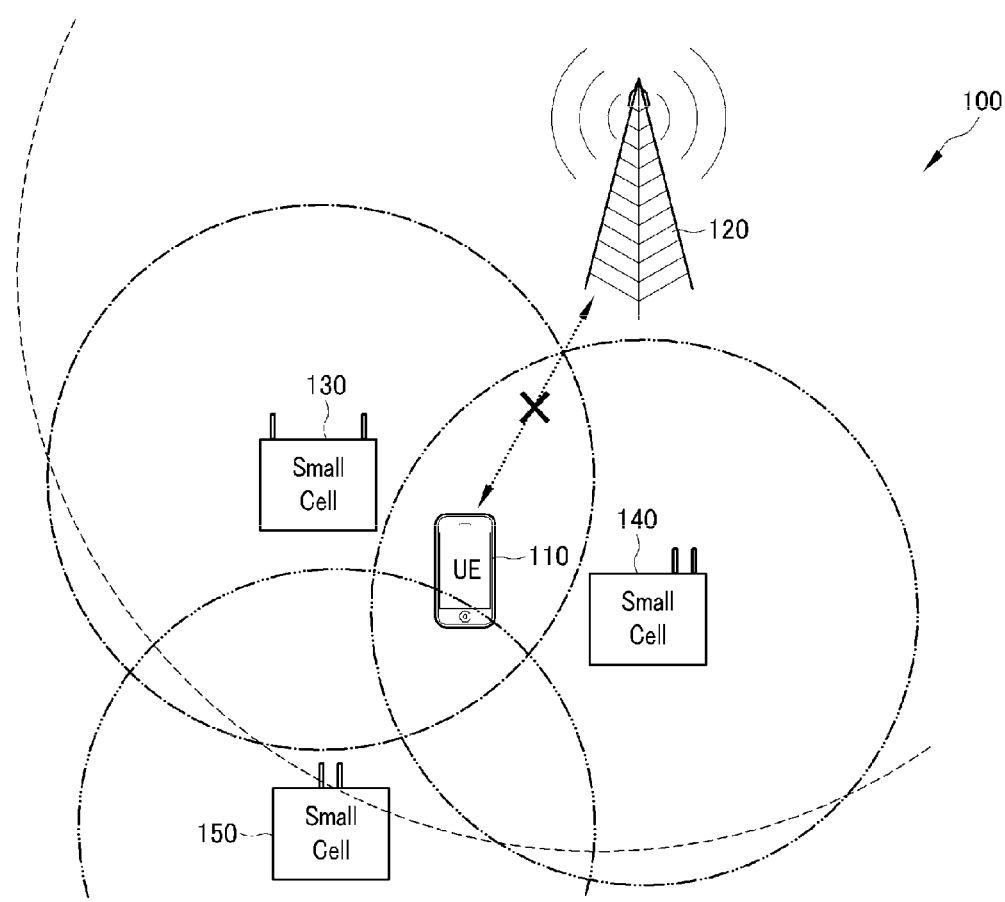
FIG. 1 shows a diagram of an example mobile communication system where a user equipment may perform cell selection operation in a dense small cell environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices and computer program products related to generation of a pilot signal in a mobile communication system.

Briefly stated, technologies are generally described for generation of pilot signal patterns in a base station, such as a small-cell base station, or a self-organizing network (SON) in a mobile communication system. Example devices/systems described herein may include one or more of a storage unit, a control unit and/or a communication unit in a base station. The storage unit may be configured to store a pilot signal pattern corresponding to a power variation between a first power level and a second power level. The control unit may be coupled to the storage unit and configured to generate a pilot signal in accordance with the stored pilot signal pattern. Further, the communication unit may be coupled to the control unit and configured to transmit the generated pilot signal such that any nearby mobile stations (or user equipment) may use the signal to perform cell selection or re-selection. In some embodiments, the communication unit may be further configured to receive the pilot signal pattern from a SON server and store the received pilot signal pattern in the storage unit including an operational parameter database. In some other embodiments, the communication unit may be further configured to receive a cell identifier from a SON server and store the received cell identifier in the storage unit, such that the control unit may generate another pilot signal pattern associated with the stored cell identifier. In some other embodiments, the communication unit may be further configured to receive radio parameters from neighbor base stations (e.g., including pilot signal patterns for the base stations), such that the control unit may adjust the pilot signal pattern based on the received radio parameters.

FIG. 1 shows a diagram of an example mobile communication system where a user equipment may perform cell selection operation in a dense small cell environment, arranged in accordance with at least some embodiments described herein. As depicted, a mobile communication system 100 may include one or more of a user equipment 110, a macro-cell base station 120, a small-cell base station 130, a small-cell base station 140 and/or a small-cell base station 150. In some embodiments, mobile communication system 100 may be a cellular network system employing any suitable cellular technology including, but not limited to, Global System for Mobile communications (GSM), Code Division Multiple Access (CDMA), Long Term Evolution (LTE), Worldwide Interoperability for Microwave Access (WiMax) technology, and/or others.

In some embodiments, each of small-cell base stations 130 to 150 may be a low-powered radio access node that has a communication range of a small-cell network including, but not limited to, a microcell, a femtocell, a picocell, a relay, a hotspot, and/or others. Small-cell base stations 130 to 150 may be typically designed for use in a home or small business in such a manner that it allows a service provider to extend service coverage indoors or at the cell edge, for example, supporting several active user equipments in a residential setting. On the other hand, macro-cell base station 120 may be a high-powered radio base station that provides a greater communication range than a small-cell network. Further, user equipment 110 may be any suitable type of mobile device with wireless communication capabilities including, but not limited to, a cellular phone, a smartphone, a tablet computer, a wearable computer such as smartglasses or smartwatch, or other wireless communication device.

In operation, user equipment 110 may receive pilot signals from small-cell base stations 130 to 150 as well as macro-cell base station 120. In some embodiments, each of small-cell base stations 130 to 150 and macro-cell base station 120 may transmit a pilot signal with a constant power level. In this case, the power level of pilot signals detected by user equipment 110 may change depending on the distances between user equipment 110 and base stations 120 to 150.

Figure 2:
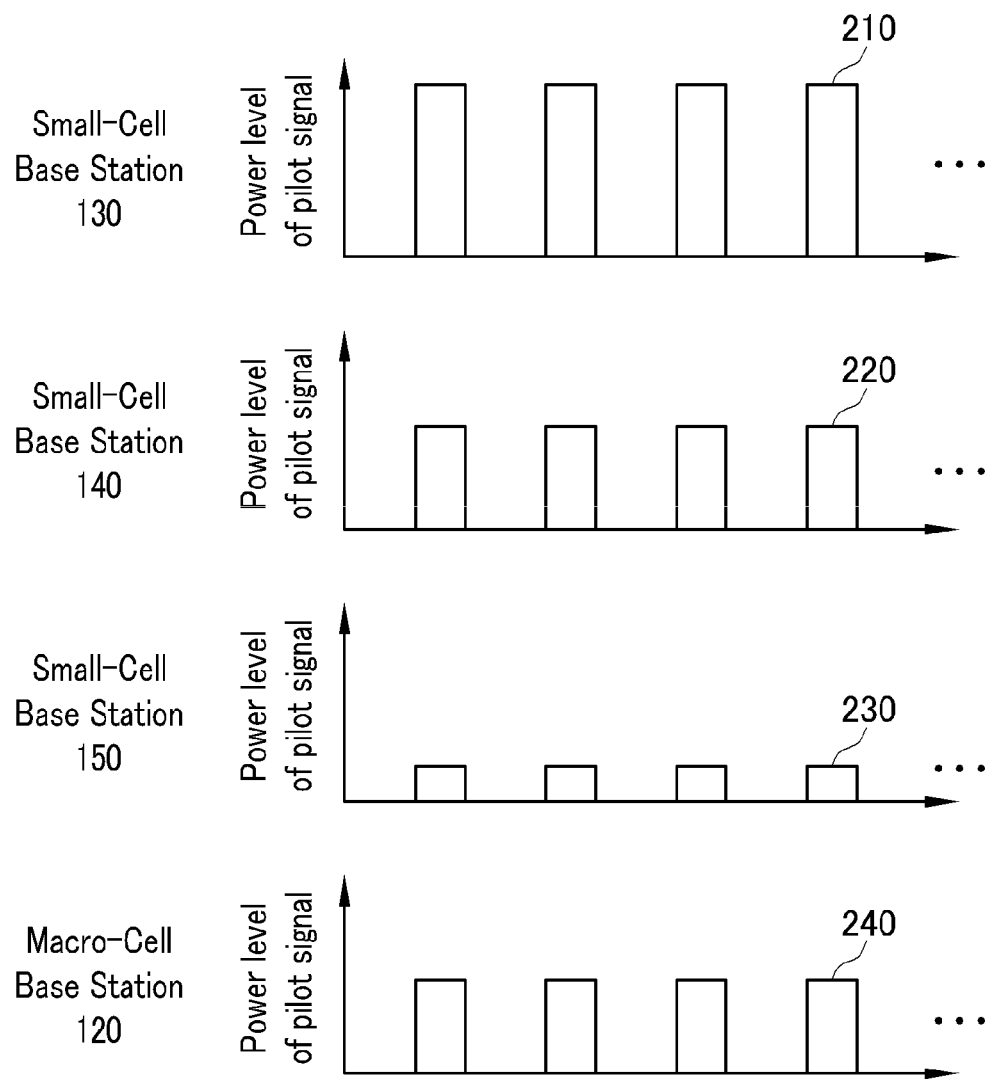
FIG. 2 illustrates a graph showing example power levels of pilot signals that may be generated by a macro-cell base station and small-cell base stations in accordance with constant power levels and detected by a user equipment.

FIG. 2 illustrates a graph showing example power levels of pilot signals that may be generated by a macro-cell base station and small-cell base stations in accordance with constant power levels and detected by a user equipment, arranged in accordance with at least some embodiments described herein. As illustrated, power levels 210 to 240 of pilot signals that are transmitted from base stations 120 to 150 and detected by user equipment 110, respectively, may vary depending on the distances between user equipment 110 and base stations 120 to 150. For example, power level 210 of pilot signal from small-cell base station 130 may be detected by user equipment 110 to be the highest among all the pilot signals because small-cell base station 130 may be located in closest proximity to user equipment 110. On the other hand, power level 230 of pilot signal from small-cell base station 150 may be the smallest among all the pilot signals because small-cell base station 150 may be located most remotely from user equipment 110. However, if user equipment 110 is intended to access macro-cell base station 120, the pilot signals from neighbor base stations 130 and 140 with relatively greater power levels may interfere with the detection of the pilot signal from macro-cell base station 120 by user equipment 110. As such, when a user equipment is located in an area where small-cells are densely populated while trying to access a remote macro-cell base station, pilot signals with greater power levels from nearby small cells may hinder the detection of a pilot signal from the macro base station.

In some embodiments, each of small-cell base stations 130 to 150 may be configured to store a pilot signal pattern corresponding to a power variation with a predetermined power level range (e.g., power variation between a first power level and a second power level). Further, each small-cell base station 130 to 150 may be configured to generate a pilot signal according to the stored pilot signal pattern and transmit the generated pilot signal, such that any nearby user equipment equipment can use the pilot signals to perform cell selection or re-selection.

Figure 3:
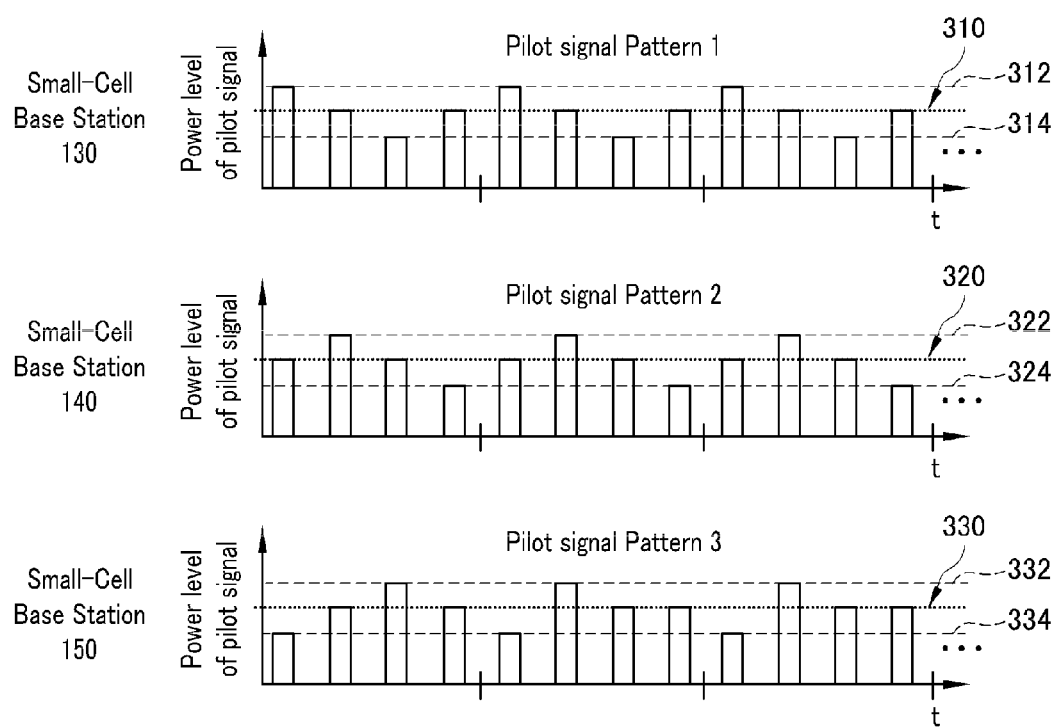
FIG. 3 illustrates a graph showing example pilot signals that may be generated by small-cell base stations in accordance with pilot signal patterns corresponding to power variation.

FIG. 3 illustrates a graph showing example pilot signals that may be generated by small-cell base stations in accordance with pilot signal patterns corresponding to power variation, arranged in accordance with at least some embodiments described herein. As illustrated, each of small-cell base stations 130 to 150 may be configured to generate a pilot signal having a power variation between a first power level and a second power level. In some embodiments, the first power level may be set to be greater than the second power level. For example, the first power level may be set to be about 20 dBm to about 26 dBm while the second power level may be set to be about −20 dBm or less than −20 dBm. For example, the generated pilot signal may have a power level corresponding to a predetermined time-variant pilot signal pattern 1 to 3, for example. The generation of such pilot signals may be performed by each of small-cell base stations 130 to 150 in cooperation with neighbor small-cell base stations and/or a self-organizing network (SON) server. As such, even when user equipment 110 is located in an area where small-cell base stations 130 to 150 are densely populated, user equipment 110 may be able to detect a pilot signal (or cell search signal) that is transmitted from macro-cell base station 120, at least during a period when the detected power levels of pilot signals from small-cell base stations 130 to 150 are less than that of pilot signal from macro-cell base station 120.

In some embodiments, each of small-cell base stations 130 to 150 may be configured to generate a pilot signal corresponding to a periodic pilot signal pattern 1 to 3, each of which may have a power variation between a first power level and a second power level. For example, pilot signal pattern 1 may have a power variation between a first power level 312 and a second power level 314 with an average power level 310. Similarly, pilot signal pattern 2 may have a power variation between a first power level 322 and a second power level 324 with an average power level 320, while pilot signal pattern 3 may have a power variation between a first power level 332 and a second power level 334 with an average power level 330. Each of average power levels 310 to 330 of pilot signal patterns 1 to 3, respectively, may be equivalent to a reference power level. Further, the pilot signal patterns 1 to 3 may be determined in such a manner that the sum of the power levels of pilot signal patterns 1 to 3 at a particular time is generally constant. In this manner, if pilot signals in accordance with pilot signal patterns 1 to 3 are constantly transmitted within a same area, the sum of power levels of the pilot signals detected by user equipment 110 may be maintained to be substantially same. In the meantime, macro-cell base station 120 may transmit a pilot signal with a constant power level, such that the pilot signal transmitted from macro-cell base station 120 may be readily detected by user equipment 110 when at least some of the pilot signals from small-cell base stations 130 to 150 are detected to have lower power levels.

Figure 4:
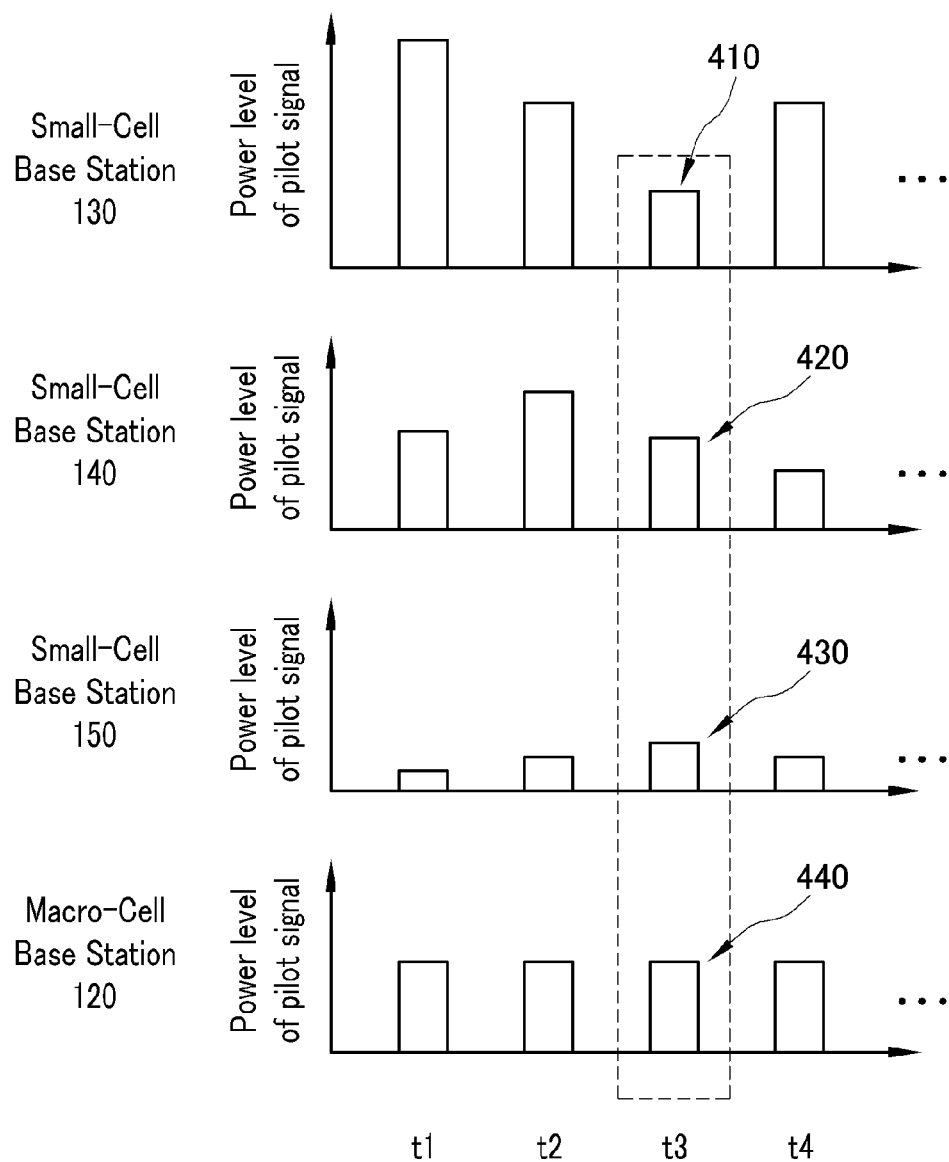
FIG. 4 illustrates a graph showing example power levels of pilot signals that may be generated by a macro-cell base station and small-cell base stations in accordance with time-variant power levels and detected by a user equipment.

FIG. 4 illustrates a graph showing example power levels of pilot signals that may be generated by a macro-cell base station and small-cell base stations in accordance with time-variant power levels and detected by a user equipment, arranged in accordance with at least some embodiments described herein. As depicted, the pilot signals transmitted from small-cell base stations 130 to 150 may have time-variant power levels while the pilot signal transmitted from macro-cell base station 120 may have a generally constant power level. At times t1, t2 and t4, the power levels of at least one of the pilot signals from small-cell base stations 130 to 150 may be greater than that of the pilot signal from macro-cell base station 120. As a result, user equipment 110 may not be able to detect the pilot signal from macro-cell base station 120. However, at time t3, a power level 440 of the pilot signal from macro-cell base station 120 may be greater than or substantially same as those 410 to 430 from small-cell base stations 130 to 150, such that user equipment 110 may be more readily able to detect the pilot signal from macro-cell base station 120.

In some embodiments, a SON server may be installed in a mobile communication system, where the SON server may be configured to generate one or more pilot signal patterns each corresponding to a power variation and assign the generated pilot signal patterns to base stations installed in the same communication system. In other embodiments, components alternatively or in addition to a SON server may be involved in the generation or in controlling the generation of the pilot signal pattern(s). For the sake of simplicity, at least some of the embodiments will be and are described herein are in the context of a SON server.

Figure 5:
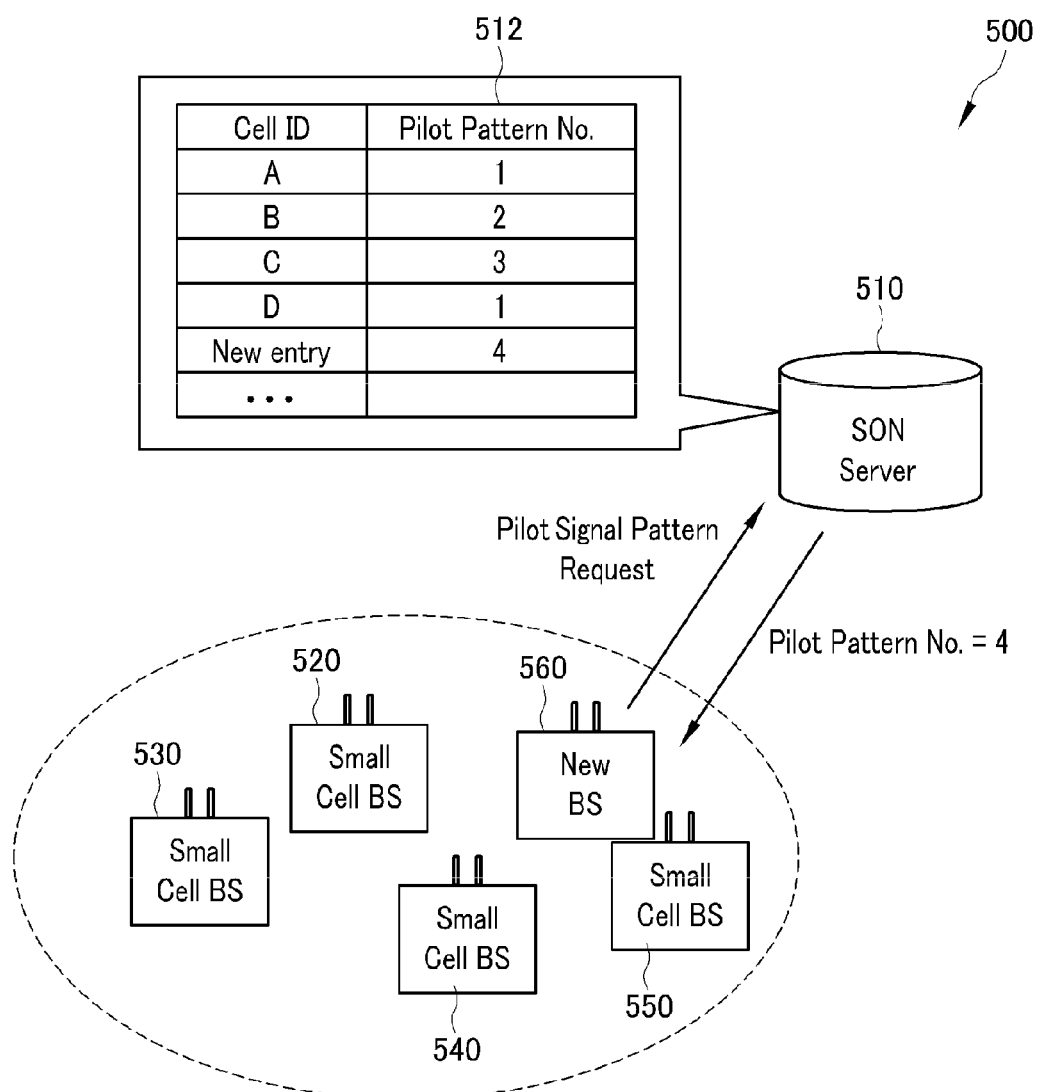
FIG. 5 illustrates a diagram of an example mobile communication system including a SON server and one or more base stations, each configured to generate a pilot signal pattern corresponding to a power variation.

FIG. 5 illustrates a diagram of an example mobile communication system including a SON server and one or more base stations each configured to generate a pilot signal pattern corresponding to a power variation, arranged in accordance with at least some embodiments described herein.

As depicted in FIG. 5, a mobile communication system 500 may include one or more of a SON server 510 and/or small-cell base stations 520 to 550 that may be communicatively coupled to SON server 510. SON server 510 may include a storage unit 512, such as a storage device configured to store or operate as a base station parameter database, which in turn may be configured to store pilot signal patterns 1, 2, 3 and 1 and cell identifiers (IDs) A to D associated with the pilot signal patterns, respectively. Each of the pilot signal patterns 1 to 3 may correspond to a predetermined power variation (e.g., power variation between a first power level and a second power level). Further, the cell IDs A to D may be assigned to small-cell base stations 520 to 550, respectively.

In some embodiments, the pilot signal patterns 1 to 3 generated by SON server 510 may be determined by SON server 510 in cooperation with small-cell base stations 520 to 550. Alternatively, the pilot signal patterns 1 to 3 may be determined in accordance with predetermined standards such as domestic or international telecommunication standards or any other types of telecommunication standards defined by a telecommunication service provider.

Further, when a new small-cell base station 560 is installed in mobile communication system 500, base station 560 may transmit a pilot signal pattern request to SON server 510. In response to the pilot signal pattern request that may include a new cell ID assigned to base station 560, SON server 510 may generate a new pilot signal pattern 4 associated with the new cell ID and store the generated pilot signal pattern 4 in storage unit 512. Further, SON server 510 may transmit the pilot signal pattern 4 to base station 560, such that base station 560 may generate a pilot signal in accordance with the pilot signal pattern 4.

Figure 6:
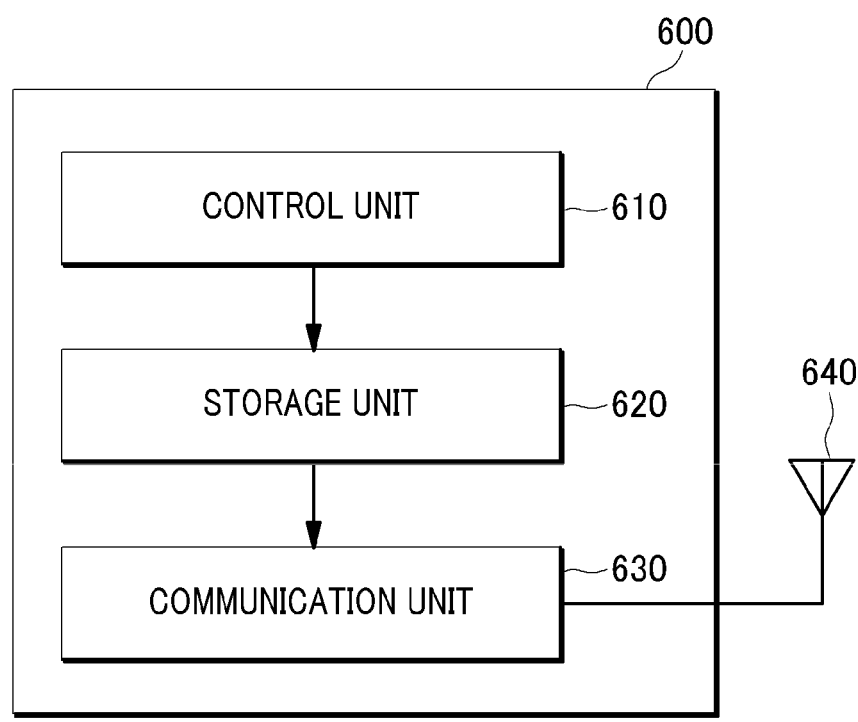
FIG. 6 illustrates a block diagram of an example base station configured to generate a pilot signal pattern corresponding to a power variation.

FIG. 6 illustrates a block diagram of an example base station configured to generate a pilot signal pattern corresponding to a power variation, arranged in accordance with at least some embodiments described herein. As depicted, a base station 600 may include one or more of a control unit 610, a storage unit 620 and/or a communication unit 630. In some embodiments, base station 600 may be a small-cell base station including, but not limited to, a microcell, a femtocell, a picocell, a relay and a hotspot. Further, each of small-cell base stations 130 to 150 as illustrated in FIG. 1 and/or small-cell base stations 520 to 560 as illustrated in FIG. 5 may include a similar configuration as base station 600 of FIG. 6.

In some embodiments, storage unit 620 may be configured to store a pilot signal pattern corresponding to a power variation between a first power level and a second power level. For example, the pilot signal pattern may correspond to a periodic power variation between the first power level and the second power level. Also, storage unit 620 may include an operational parameter database configured to store various operational parameters such as identification parameters (e.g., physical cell identity, E-UTRAN cell global identifier, track area code, public land mobile network identifier, etc.), radio parameters (e.g., initial power, transmission power, random access channel parameters, etc.), handover parameters (e.g., hysteresis, threshold, offset, speed dependent offset, time to trigger, etc.) and/or a neighbor relation table.

In some embodiments, storage unit 620 may be coupled to control unit 610, which may be configured to generate a pilot signal in accordance with the pilot signal pattern stored in storage unit 620. Further, control unit 610 may be coupled to communication unit 630, which may be configured to transmit the generated pilot signal through a wireless antenna 640.

In some embodiments, communication unit 630 may be further configured to receive the pilot signal pattern from a SON server and store the received pilot signal pattern in storage unit 620. In some other embodiments, communication unit 630 may be further configured to receive a cell ID from a SON server through wireless antenna 640 and store the received cell ID in storage unit 620. In this case, control unit 610 may generate another pilot signal pattern associated with the stored cell ID. Additionally or alternatively, communication unit 630 may be further configured to receive radio parameters from neighbor base stations through wireless antenna 640, such that control unit 610 may adjust the pilot signal pattern based on the received radio parameters.

Figure 7:
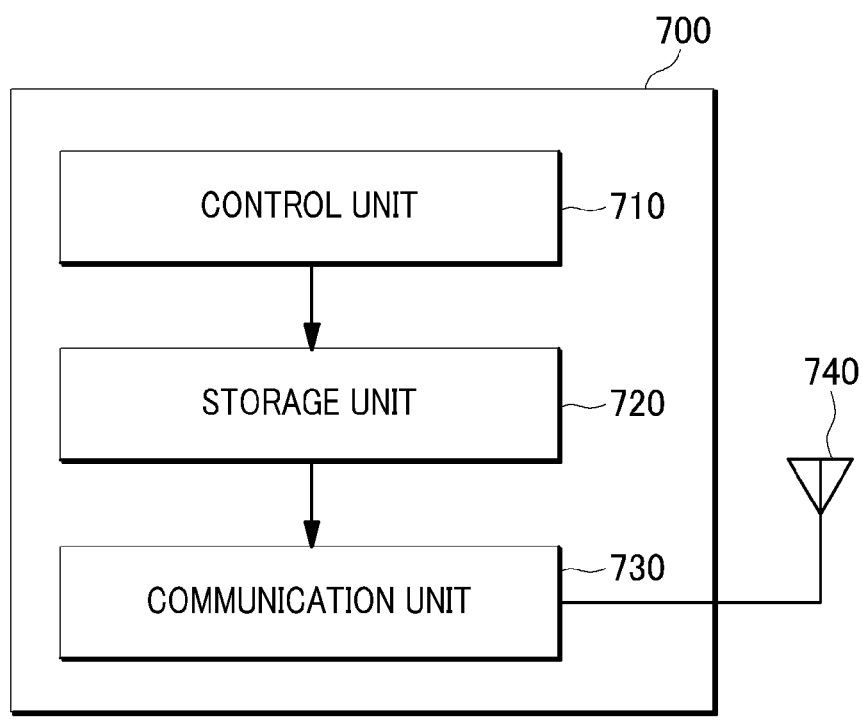
FIG. 7 illustrates a block diagram of an example SON server configured to generate a pilot signal pattern corresponding to a power variation.

FIG. 7 illustrates a block diagram of an example SON server configured to generate a pilot signal pattern corresponding to a power variation, arranged in accordance with at least some embodiments described herein. As depicted, a SON server 700 may include one or more of a control unit 710, a storage unit 720 and/or a communication unit 730. In some embodiments, SON server 700 may be located in an elements management system or an operation and management server. Further, SON server 510 as illustrated in FIG. 5 may include a similar configuration as SON server 700 of FIG. 7.

In some embodiments, control unit 710 may be configured to generate one or more pilot signal patterns each corresponding to a power variation between a first power level and a second power level. Further, control unit 710 may be coupled to storage unit 720, which may be configured to store the generated pilot signal patterns and one or more cell identifiers associated with the generated pilot signal patterns. For example, storage unit 720 may include a base station parameter database configured to store various operational parameters for pilot signal pattern generation, resource partitioning and coordination, load balancing between cells, etc.

In some embodiments, storage unit 720 may be coupled to communication unit 730, which may be configured to, in response to a pilot signal pattern request that includes a cell identifier, transmit a pilot signal pattern associated with the cell identifier among the pilot signal patterns stored in storage unit 720, through a wireless antenna 740. In some embodiments, communication unit 730 may be further configured to receive radio parameters, which may include pilot signal patterns, from one or more base stations through wireless antenna 740. In this case, control unit 710 may adjust the pilot signal patterns based on the received radio parameters.

Figure 8:
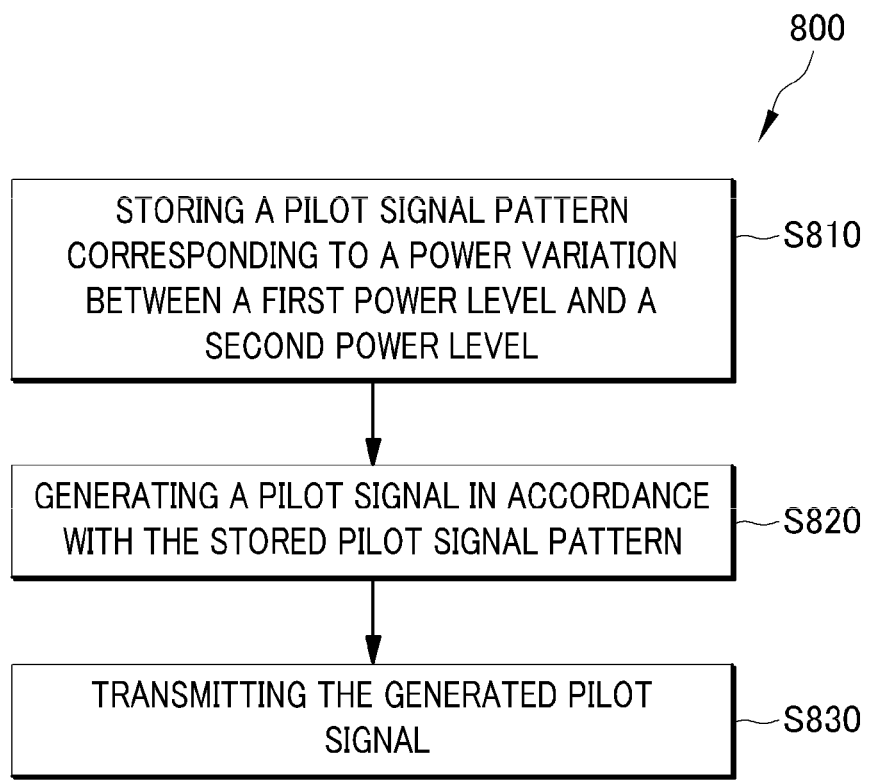
FIG. 8 illustrates an example flow diagram of a method adapted to generate a pilot signal in a base station.

FIG. 8 illustrates an example flow diagram of a method adapted to generate a pilot signal in a base station, arranged in accordance with at least some embodiments described herein. An example method 800 in FIG. 8 may be implemented using, for example, a computing device including a processor adapted to generate a pilot signal in a base station.

Method 800 may include one or more operations, actions, or functions as illustrated by one or more of blocks 5810, 5820 and/or 5830. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. Method 800 may begin at block 5810, "STORING A PILOT SIGNAL PATTERN CORRESPONDING TO A POWER VARIATION BETWEEN A FIRST POWER LEVEL AND A SECOND POWER LEVEL."

At block 5810, a pilot signal pattern corresponding to a power variation between a first power level and a second power level may be stored. As depicted in FIG. 1, storage unit 620 may store a pilot signal pattern corresponding to a power variation between a first power level and a second power level. For example, the pilot signal pattern may correspond to a periodic power variation between the first power level and the second power level. Block 5810 may be followed by block 5820, "GENERATING A PILOT SIGNAL IN ACCORDANCE WITH THE STORED PILOT SIGNAL PATTERN."

At block 5820, a pilot signal in accordance with the stored pilot signal pattern may be generated. As illustrated in FIG. 6, control unit 610 may generate a pilot signal in accordance with the pilot signal pattern stored in storage unit 620. Block 5820 may be followed by block 5830, "TRANSMITTING THE GENERATED PILOT SIGNAL."

At block 5830, the generated pilot signal may be transmitted. As illustrated in FIG. 6, communication unit 630 may transmit the generated pilot signal. In some embodiments, communication unit 630 may receive the pilot signal pattern from a SON server and store the received pilot signal pattern in storage unit 620. In some other embodiments, communication unit 630 may receive a cell ID from a SON server and store the received cell ID in storage unit 620. In this case, control unit 610 may generate another pilot signal pattern associated with the stored cell ID. Additionally or alternatively, communication unit 630 may receive radio parameters from neighbor base stations, such that control unit 610 may adjust the pilot signal pattern based on the received radio parameters.

Figure 9:
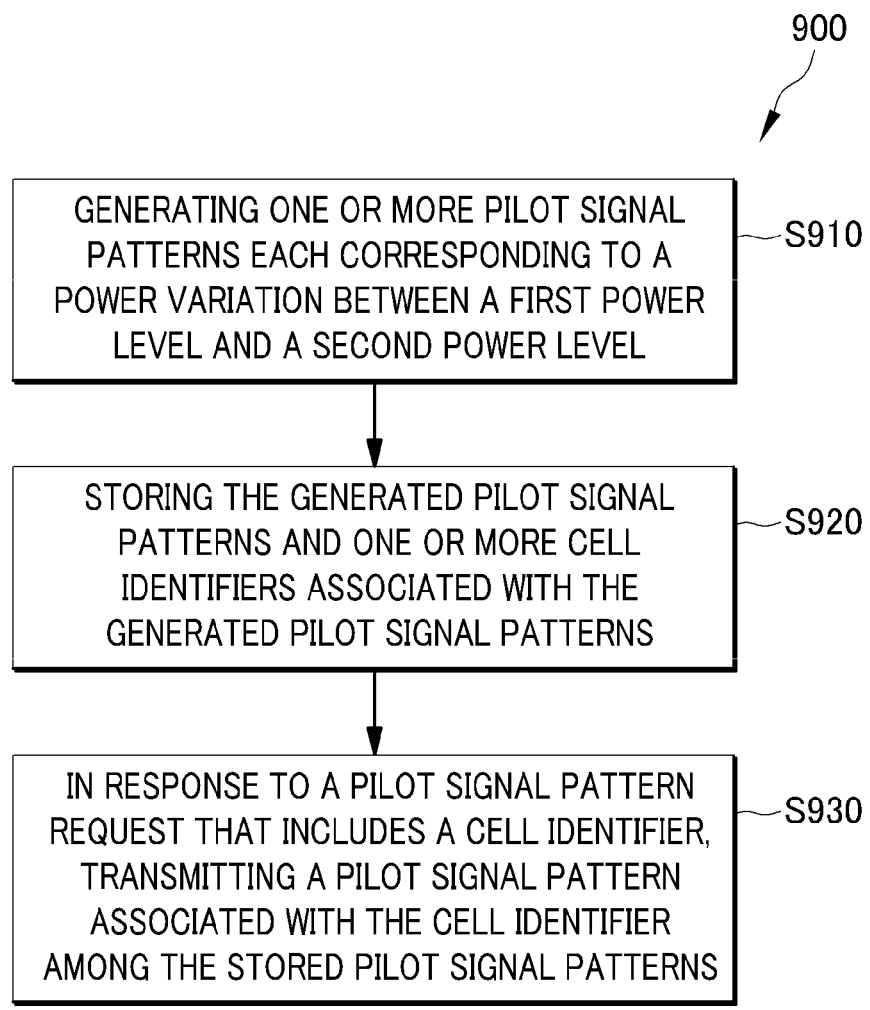
FIG. 9 illustrates another example flow diagram of a method adapted to generate a pilot signal in a SON sever.

FIG. 9 illustrates another example flow diagram of a method adapted to generate a pilot signal in a SON sever, arranged in accordance with at least some embodiments described herein. An example method 900 in FIG. 9 may be implemented using, for example, a computing device including a processor adapted to generate a pilot signal in a SON server.

Method 900 may include one or more operations, actions, or functions as illustrated by one or more of blocks 5910, 5920 and/or 5930. Although illustrated as discrete blocks, various blocks may be divided into additional blocks, combined into fewer blocks, supplemented with other blocks, or eliminated, depending on the desired implementation. In some further examples, the various described blocks may be implemented as a parallel process instead of a sequential process, or as a combination thereof. Method 900 may begin at block 5910, "GENERATING ONE OR MORE PILOT SIGNAL PATTERNS EACH CORRESPONDING TO A POWER VARIATION BETWEEN A FIRST POWER LEVEL AND A SECOND POWER LEVEL."

At block 5910, one or more pilot signal patterns each corresponding to a power variation between a first power level and a second power level may be generated. As illustrated in FIG. 7, control unit 710 may generate one or more pilot signal patterns each corresponding to a power variation between a first power level and a second power level. Block 5910 may be followed by block 5920, "STORING THE GENERATED PILOT SIGNAL PATTERNS AND ONE OR MORE CELL IDENTIFIERS ASSOCIATED WITH THE GENERATED PILOT SIGNAL PATTERNS."

At block 5920, the generated pilot signal patterns and one or more cell identifiers associated with the generated pilot signal patterns may be stored. For example, as illustrated in FIG. 7, base station storage unit 720 may store the generated pilot signal patterns and one or more cell identifiers associated with the generated pilot signal patterns. For example, base station storage unit 720 may include a base station parameter database configured to store various operational parameters for pilot signal pattern generation, resource partitioning and coordination, load balancing between cells, etc. Block 5920 may be followed by block 5930, "IN RESPONSE TO A PILOT SIGNAL PATTERN REQUEST THAT INCLUDES A CELL IDENTIFIER, TRANSMITTING A PILOT SIGNAL PATTERN ASSOCIATED WITH THE CELL IDENTIFIER AMONG THE STORED PILOT SIGNAL PATTERNS."

At block S930, in response to a pilot signal pattern request that includes a cell identifier, a pilot signal pattern associated with the cell identifier among the stored pilot signal patterns may be transmitted. As illustrated in FIG. 7, in response to a pilot signal pattern request that includes a cell identifier, communication unit 730 may transmit a pilot signal pattern associated with the cell identifier among the pilot signal patterns stored in base station storage unit 720. In some embodiments, communication unit 730 may receive radio parameters, which may include pilot signal patterns, from one or more base stations. In this case, control unit 710 may adjust the pilot signal patterns based on the received radio parameters.

In light of the present disclosure, for this and other methods disclosed herein, the functions and operations performed in the methods may be implemented in differing order. Furthermore, the outlined operations are only provided as examples, and some of the operations may be optional, combined into fewer operations, supplemented with other operations, or expanded into additional operations without detracting from the essence of the disclosed embodiments.

Figure 10:
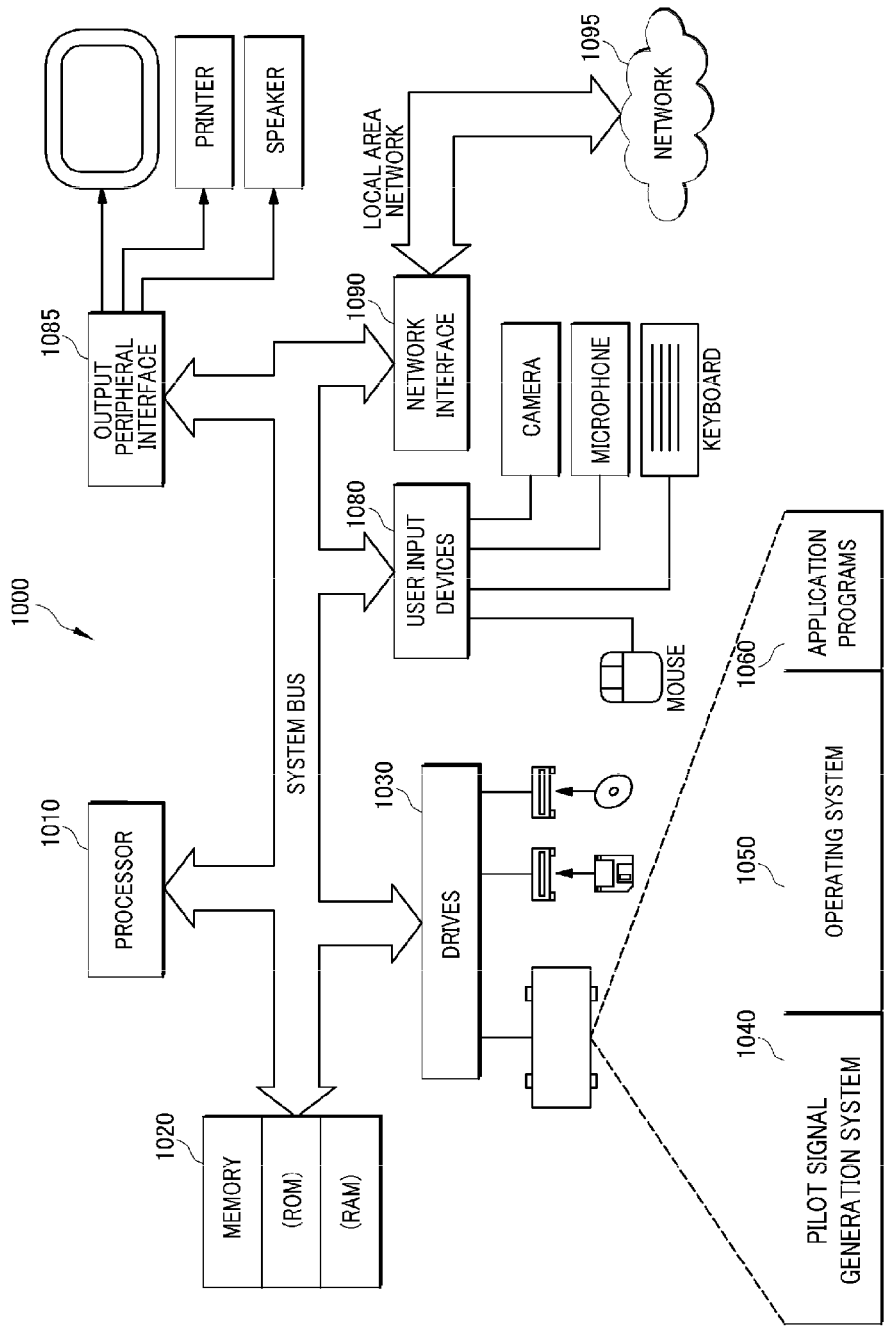
FIG. 10 shows a block diagram illustrating an example computing system that may be configured to generate a pilot signal.

FIG. 10 shows a block diagram illustrating an example computing system that may be configured to generate a pilot signal, arranged in accordance with at least some embodiments described herein. As depicted in FIG. 10, a computer 1000 may include a processor 1010, a memory 1020 and one or more drives 1030. Computer 1000 may be implemented as a computer system, an embedded control computer, a laptop, or a server computer, a mobile device, a set-top box, a kiosk, a vehicular information system, a mobile telephone, a customized machine, or other hardware platform.

Drives 1030 and their associated computer storage media may provide storage of computer readable instructions, data structures, program modules and other data for computer 1000. Drives 1030 may include a pilot signal generation system 1040, an operating system (OS) 1050, and application programs 1060. Pilot signal generation system 1040 may be adapted to control a base station or a SON server in such a manner as described above with respect to FIGS. 1 to 9.

Computer 1000 may further include user input devices 1080 through which a user may enter commands and data. Input devices may include an electronic digitizer, a camera, a microphone, a keyboard and pointing device, commonly referred to as a mouse, trackball or touch pad. Other input devices may include a joystick, game pad, satellite dish, scanner, or the like.

These and other input devices may be coupled to processor 1010 through a user input interface that is coupled to a system bus, but may be coupled by other interface and bus structures, such as a parallel port, game port or a universal serial bus (USB). Computers such as computer 1000 may also include other peripheral output devices such as display devices, which may be coupled through an output peripheral interface 1085 or the like.

Computer 1000 may operate in a networked environment using logical connections to one or more computers, such as a remote computer coupled to a network interface 1090. The remote computer may be a personal computer, a server, a router, a network PC, a peer device or other common network node, and may include many or all of the elements described above relative to computer 1000.

Networking environments are commonplace in offices, enterprise-wide area networks (WAN), local area networks (LAN), intranets, and the Internet. When used in a LAN or WLAN networking environment, computer 1000 may be coupled to the LAN through network interface 1090 or an adapter. When used in a WAN networking environment, computer 1000 typically includes a modem or other means for establishing communications over the WAN, such as the Internet or a network 1095. The WAN may include the Internet, the illustrated network 1095, various other networks, or any combination thereof. It will be appreciated that other mechanisms of establishing a communication link, ring, mesh, bus, cloud, or network between the computers may be used.

In some embodiments, computer 1000 may be coupled to a networking environment. Computer 1000 may include one or more instances of a physical computer-readable storage medium or media associated with drives 1030 or other storage devices. The system bus may enable processor 1010 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 1020, whether characterized as RAM, ROM, flash, or other types of volatile or nonvolatile memory technology. The media may also represent secondary storage, whether implemented as storage drives 1030 or otherwise. Hard drive implementations may be characterized as solid state, or may include rotating media storing magnetically encoded information.

Processor 1010 may be constructed from any number of transistors or other circuit elements, which may individually or collectively assume any number of states. More specifically, processor 1010 may operate as a state machine or finite-state machine. Such a machine may be transformed to a second machine, or specific machine by loading executable instructions. These computer-executable instructions may transform processor 1010 by specifying how processor 1010 transitions between states, thereby transforming the transistors or other circuit elements constituting processor 1010 from a first machine to a second machine. The states of either machine may also be transformed by receiving input from user input devices 1080, network interface 1090, other peripherals, other interfaces, or one or more users or other actors. Either machine may also transform states, or various physical characteristics of various output devices such as printers, speakers, video displays, or otherwise.

Figure 11:
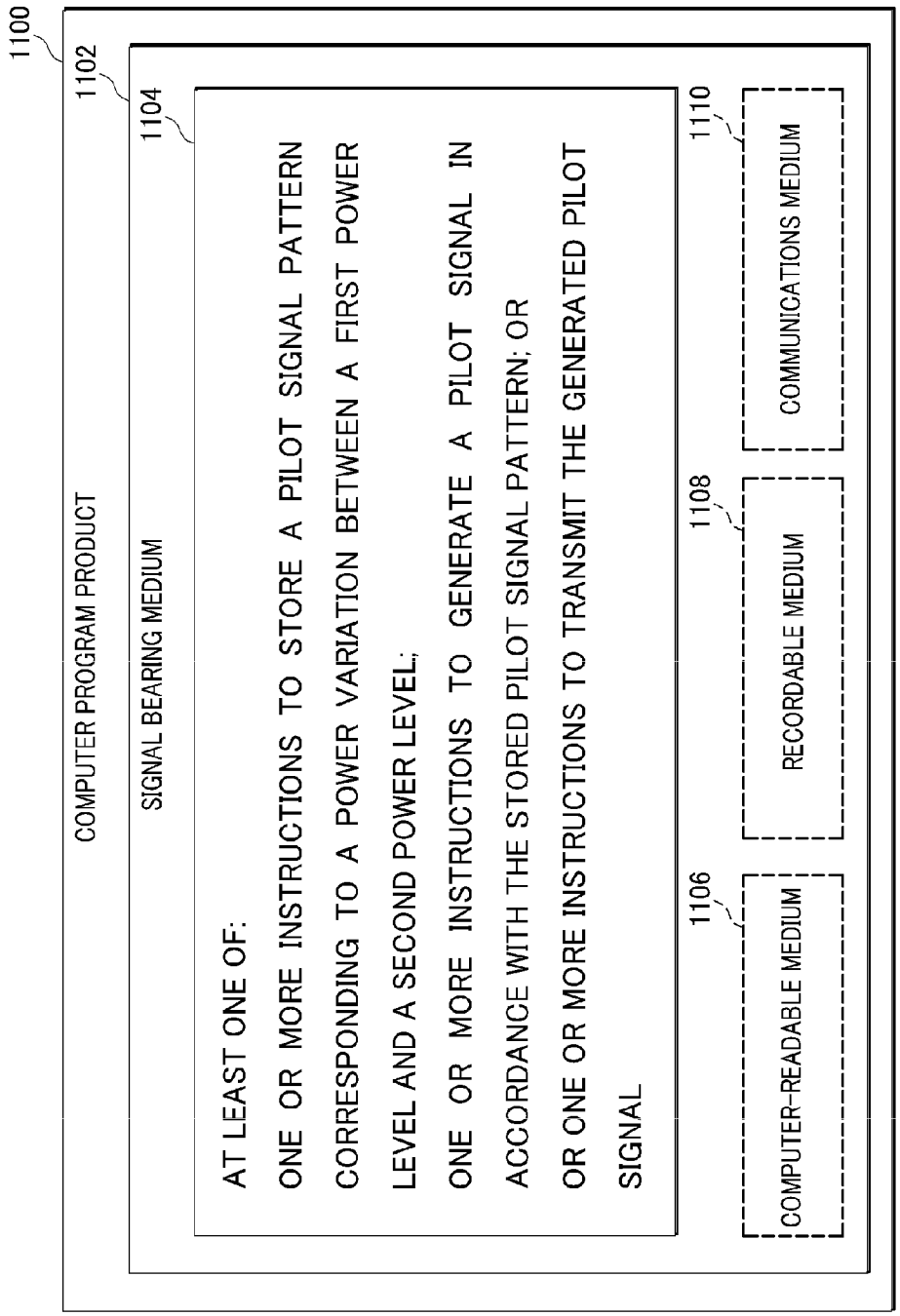
FIG. 11 illustrates a computer program product that may be utilized to generate a pilot signal in a base station.

FIG. 11 illustrates a computer program product that may be utilized to generate a pilot signal in a base station, in accordance with at least some embodiments described herein. Computer program product 1100 may include a signal bearing medium 1102. Signal bearing medium 1102 may include one or more instructions 1104 that, in response to execution by, for example, a processor, may provide the functionality and features described above with respect to FIGS. 1 to 10. By way of example, instructions 1104 may include at least one of: one or more instructions to store a pilot signal pattern corresponding to a power variation between a first power level and a second power level; one or more instructions to generate a pilot signal in accordance with the stored pilot signal pattern; or one or more instructions to transmit the generated pilot signal. Thus, for example, referring to FIGS. 1 to 7, base station 130, 140, 150, 520, 530, 540, 550, 560 or 600 may undertake one or more of the blocks shown in FIG. 8 in response to instructions 1104.

Figure 12:
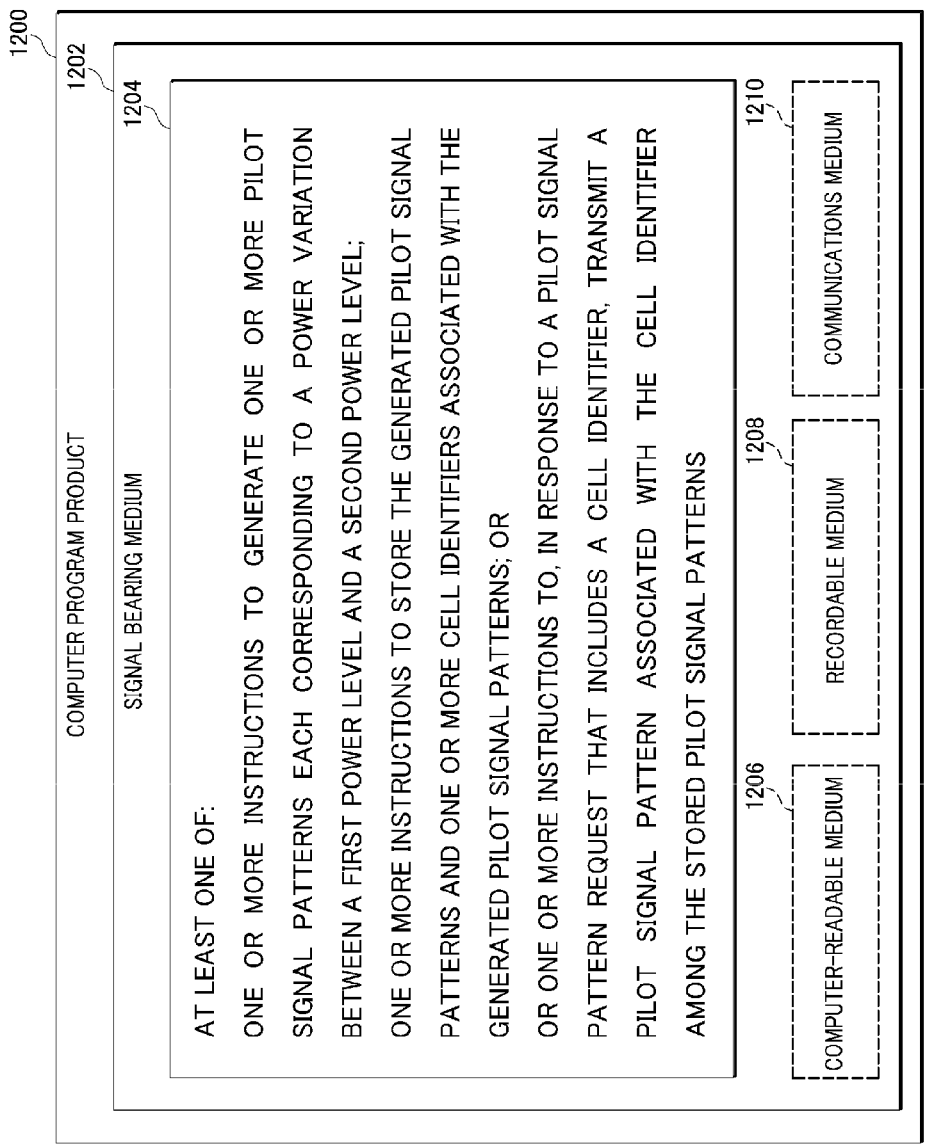
FIG. 12 illustrates a computer program product that may be utilized to generate a pilot signal in a SON server, all arranged in accordance with at least some embodiments described herein.

FIG. 12 illustrates a computer program product that may be utilized to generate a pilot signal in a SON server, in accordance with at least some embodiments described herein. Computer program product 1200 may include a signal bearing medium 1202. Signal bearing medium 1202 may include one or more instructions 1204 that, in response to execution by, for example, a processor, may provide the functionality and features described above with respect to FIGS. 1 to 10. By way of example, instructions 1204 may include at least one of: one or more instructions to generate one or more pilot signal patterns each corresponding to a power variation between a first power level and a second power level; one or more instructions to store the generated pilot signal patterns and one or more cell identifiers associated with the generated pilot signal patterns; or one or more instructions to, in response to a pilot signal pattern request that includes a cell identifier, transmit a pilot signal pattern associated with the cell identifier among the stored pilot signal patterns. Thus, for example, referring to FIGS. 1 to 7, SON server 510 or 700 may undertake one or more of the blocks shown in FIG. 9 in response to instructions 1204.

In some implementations, signal bearing medium 1102 or 1202 may encompass a non-transitory computer-readable medium 1106 or 1206, such as, but not limited to, a hard disk drive (HDD), a Compact Disc (CD), a Digital Video Disk (DVD), a digital tape, memory, etc. In some implementations, signal bearing medium 1102 or 1202 may encompass a recordable medium 1108 or 1208, such as, but not limited to, memory, read/write (R/W) CDs, R/W DVDs, etc. In some implementations, signal bearing medium 1102 or 1202 may encompass a communications medium 1110 or 1210, such as, but not limited to, a digital and/or an analog communication medium (e.g., a fiber optic cable, a waveguide, a wired communication link, a wireless communication link, etc.). Thus, for example, computer program product 1100 or 1200 may be conveyed to one or more modules of base station 130, 140, 150, 520, 530, 540, 550, 560 or 600 or SON server 510 or 700 by an RF signal bearing medium 1102 or 1202, where the signal bearing medium 1102 or 1202 is conveyed by a wireless communications medium 1110 or 1210 (e.g., a wireless communications medium conforming with the IEEE 802.11 standard).

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds, compositions or biological systems, which can, of course, vary. The terminology used herein is for the purpose of describing particular embodiments only, and is not intended to be limiting.

The herein described subject matter sometimes illustrates different components contained within, or connected with, different other components. Such depicted architectures are merely examples, and in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed is:

1. A base station, comprising:
    a memory configured to store a first pilot signal pattern that corresponds to a power variation between a first power level and a second power level, wherein the first pilot signal pattern is associated with a second pilot signal pattern stored on a second base station, and wherein the second pilot signal pattern corresponds to the power variation between the first power level and the second power level;
    a processor coupled to the memory and configured to generate a first pilot signal in accordance with the stored first pilot signal pattern, wherein the first pilot signal is associated with a second pilot signal generated by the second base station; and
    a communication unit coupled to the processor and configured to transmit the generated first pilot signal which comprises a first power level at a point of time detected by a mobile device, wherein the second pilot signal comprises a second power level at the point of time detected by the mobile device, wherein a third power level of a third pilot signal generated by a macro-cell base station and detected by the mobile device at the point of time is higher than either the first power level or the second power level.

2. The base station of claim 1, wherein the power variation between the first power level and the second power level is periodic.

3. The base station of claim 1, wherein the communication unit further receives the first pilot signal pattern from a self-organizing network (SON) server and stores the received first pilot signal pattern in the memory, wherein the memory further stores an operational parameter database.

4. The base station of claim 1, wherein the communication unit is further configured to receive a cell identifier from a SON server and store the received cell identifier in the memory, wherein the processor is further configured to generate another pilot signal pattern associated with the stored cell identifier.

5. The base station of claim 1, wherein the communication unit is further configured to receive radio parameters from neighbor base stations that include the second base station, wherein the processor is further configured to adjust the first pilot signal pattern based on the received radio parameters.

6. The base station of claim 1, wherein the base station includes a small-cell base station.

7. A self-organizing network (SON) server comprising:
   a processor configured to generate one or more pilot signal patterns each corresponding to a power variation between a first power level and a second power level;
   a memory coupled to the processor and configured to store the generated pilot signal patterns and one or more cell identifiers associated with the generated pilot signal patterns; and
   a communication unit coupled to the memory and configured to, in response to a pilot signal pattern request that includes a cell identifier, transmit a pilot signal pattern associated with the cell identifier among the generated pilot signal patterns stored in the memory,
   wherein a first pilot signal pattern of the generated pilot signal patterns is associated with a first set of time-variant power levels detected by a mobile device,
   wherein a second pilot signal pattern of the generated pilot signal patterns is associated with a second set of time-variant power levels detected by the mobile device, and
   wherein power levels of pilot signals generated by a macro-cell base station are between the first set of time-variable power levels and the second set of time-variable power levels at any point of time.

8. The SON server of claim 7, wherein the communication unit is further configured to receive radio parameters from one or more base stations, wherein the processor is further configured to adjust the generated pilot signal patterns based on the received radio parameters.

9. The SON server of claim 7, wherein the SON server is located in an elements management system or an operation and management server.

10. The SON server of claim 7, wherein the generated pilot signal patterns are determined in accordance with at least one of domestic and international telecommunication standards or telecommunication standards defined by a telecommunication service provider.

11. A method to generate a pilot signal in a base station, the method comprising:
   storing a pilot signal pattern that corresponds to a power variation between a first power level and a second power level;
   generating the pilot signal in accordance with the stored pilot signal pattern; and
   transmitting the generated pilot signal, wherein the generated pilot signal is associated with a set of time-variable power levels detected by a mobile device, and wherein the time-variable power levels are independent from a fixed distance between the mobile device and the base station.

12. The method of claim 11, wherein the pilot signal pattern corresponds to a periodic power variation between the first power level and the second power level.

13. The method of claim 11, further comprising:
   receiving the pilot signal pattern from a self-organizing network (SON) server.

14. The method of claim 11, further comprising:
   receiving a cell identifier from a SON server;
   storing the received cell identifier; and
   generating another pilot signal pattern associated with the stored cell identifier.

15. The method of claim 11, further comprising:
   receiving radio parameters from neighbor base stations; and
   adjusting the pilot signal pattern based on the received radio parameters.

16. A method to generate a pilot signal in a self-organizing network (SON) server, the method comprising:
   generating one or more pilot signal patterns each corresponding to a power variation between a first power level and a second power level;
   storing the generated pilot signal patterns and one or more cell identifiers associated with the generated pilot signal patterns; and
   in response to a pilot signal pattern request that includes a cell identifier, transmitting a pilot signal pattern associated with the cell identifier among the stored pilot signal patterns, wherein the cell identifier corresponds to a first cell in the SON, wherein the one or more cell identifiers correspond to a set of cells in the SON, the first cell and the set of cells are adjacent and away from a macro-cell base station in the SON.

17. The method of claim 16, further comprising:
   receiving radio parameters from one or more base stations; and
   adjusting the pilot signal patterns based on the received radio parameters.

18. The method of claim 17, wherein the received radio parameters include pilot signal patterns for the one or more base stations.

* * * * *

UNITED STATES PATENT AND TRADEMARK OFFICE
CERTIFICATE OF CORRECTION

PATENT NO. : 9,813,203 B2
APPLICATION NO. : 14/302434
DATED : November 7, 2017
INVENTOR(S) : Oh et al.

Page 1 of 2

It is certified that error appears in the above-identified patent and that said Letters Patent is hereby corrected as shown below:

In the Specification

In Column 8, Lines 48-49, delete "5810, 5820 and/or 5830." and insert -- S810, S820 and/or S830. --, therefor.

In Column 8, Line 56, delete "5810," and insert -- S810, --, therefor.

In Column 8, Line 60, delete "5810," and insert -- S810, --, therefor.

In Column 8, Line 67, delete "5810" and insert -- S810 --, therefor.

In Column 9, Line 1, delete "5820," and insert -- S820, --, therefor.

In Column 9, Line 4, delete "5820," and insert -- S820, --, therefor.

In Column 9, Line 8, delete "5820" and insert -- S820 --, therefor.

In Column 9, Line 8, delete "5820," and insert -- S830, --, therefor.

In Column 9, Line 10, delete "5830," and insert -- S830, --, therefor.

In Column 9, Lines 32-33, delete "5910, 5920 and/or 5930." and insert -- S910, S920 and/or S930. --, therefor.

In Column 9, Line 40, delete "5910," and insert -- S910, --, therefor.

In Column 9, Line 44, delete "5910," and insert -- S910, --, therefor.

In Column 9, Line 50, delete "5910" and insert -- S910 --, therefor.

Signed and Sealed this
Twenty-fourth Day of April, 2018

Andrei Iancu
*Director of the United States Patent and Trademark Office*

CERTIFICATE OF CORRECTION (continued)
U.S. Pat. No. 9,813,203 B2

In Column 9, Line 50, delete "5920," and insert -- S920, --, therefor.

In Column 9, Line 55, delete "5920," and insert -- S920, --, therefor.

In Column 9, Line 65, delete "5920" and insert -- S920 --, therefor.

In Column 9, Line 65, delete "5930," and insert -- S930, --, therefor.